United States Patent
Putzolu et al.

(10) Patent No.: US 6,205,140 B1
(45) Date of Patent: Mar. 20, 2001

(54) COMMUNICATION OF DYNAMIC DEPENDENCIES ALONG MEDIA STREAMS

(75) Inventors: David M. Putzolu, Forest Grove; Donald K. Newell, Portland, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/980,510

(22) Filed: Dec. 1, 1997

(51) Int. Cl.[7] .................................................... H04L 12/28
(52) U.S. Cl. ........................... 370/389; 370/394; 370/392
(58) Field of Search ................................... 370/235, 236, 370/252, 237, 386, 389, 395, 471, 486, 465, 349, 392, 394, 464, 390, 474; 348/441

(56) References Cited

U.S. PATENT DOCUMENTS

| | | | |
|---|---|---|---|
| 5,598,415 | * | 1/1997 | Nuber et al. ............................ 370/474 |
| 5,801,781 | * | 9/1998 | Hiroshima et al. ................... 348/441 |
| 5,898,695 | * | 4/1999 | Fujii et al. ............................ 370/464 |
| 5,959,659 | * | 9/1999 | Dokic ........................................ 348/7 |
| 5,966,385 | * | 10/1999 | Fujii et al. ............................ 370/465 |
| 6,014,368 | * | 1/2000 | Sanami .................................. 370/242 |
| 6,016,166 | * | 1/2000 | Huang et al. ......................... 348/515 |
| 6,023,467 | * | 2/2000 | Abdelhamid et al. ................ 370/395 |
| 6,072,771 | * | 6/2000 | Anderson et al. .................... 370/216 |
| 6,078,594 | * | 6/2000 | Anderson et al. .................... 370/498 |
| 6,088,357 | * | 7/2000 | Anderson et al. .................... 370/392 |
| 6,091,772 | * | 7/2000 | Anderson et al. .................... 375/240 |
| 6,101,591 | * | 8/2000 | Foster et al. .......................... 711/219 |
| 6,115,422 | * | 9/2000 | Anderson et al. .................... 375/240 |
| 6,128,301 | * | 10/2000 | Bernstein ............................... 370/396 |

* cited by examiner

*Primary Examiner*—Wellington Chin
*Assistant Examiner*—Brenda H. Pham
(74) *Attorney, Agent, or Firm*—Seth Kalson

(57) ABSTRACT

A method for communicating between a sender and a receiver a set of dependencies among a set of media streams in a data network. The method comprises the step of creating a payload data packet having a header and a set of stream descriptors, where the header has a required stream field. Each stream descriptor is uniquely associated with a media stream belonging to the set of media streams and has a connection field to provide a network address for its associated media stream. Each stream descriptor that is associated with a media stream having a dependency also has a dependency field. The method also comprises the steps of creating a control data packet having the payload data packet as a payload; setting the required stream field to a value indicative of a required set of media streams, the required set of media streams being a subset of the set of media streams; and setting the dependency fields to indicate the set of relationships.

26 Claims, 2 Drawing Sheets

COMMUNICATION OF DYNAMIC DEPENDENCIES ALONG MEDIA STREAMS

FIELD OF THE INVENTION

The present invention relates to multimedia communication, and more particularly to communicating dynamic dependencies among media streams.

BACKGROUND

For purposes of this description, unless otherwise stated or implied from context, the following definitions are made. By media stream we mean data consisting of one media type. Examples are video or audio data. For simplicity, the adjective "media" is sometimes left out when it is clear from context. By media presentation (or multimedia presentation), we mean a combination of one or more media streams where the different media streams have a rendering relationship during playback. By elementary stream type, we mean a media stream consisting of data which can be rendered in the absence of any other media. The base layer of a layered video stream is an elementary stream type, while enhancement layers which depend upon the base layer are not elementary types. By coupled stream type, we mean a media stream consisting of data which cannot be rendered in the absence of other specific media streams. A common type of coupling may be due to hierarchical encoding in which enhancement layers require either the base layer or other enhancement layers. Another example of a coupled stream type may be a media stream which describes transforms to be performed on some other elementary stream type.

A common protocol for the transmission of media streams is the real time Transport (RTP) protocol. See Internet Engineering Task Force (IETF) RFC 1889. Currently, the relationships among a set of media streams comprising most media presentations are static. For example, a presentation will often consist of a single video stream and an associated audio track for the entire duration of the media presentation. For static media presentations, the Session Description Protocol (SDP) serves to statically describe the relationships among a set of media streams comprising a static media presentation. See IETF Internet Draft, "draft-ietf-mmusic-sdp.04.txt".

It is anticipated that there will be greater demand in the future for dynamic media presentations. For a dynamic media presentation, the set of media streams and their dependencies comprising the presentation will change during the time duration of the presentation. For example, where a media presentation may start as a single video stream and an associated audio stream, it may later change to multiple layers of video streams to enable client scalability, or additional audio streams may be added to the presentation at a client's request to provide higher fidelity.

It would therefore be advantageous to provide a method of communication (or association) to dynamically describe the relationships (or dependencies) among the components comprising a media presentation, thereby allowing the composition of a media presentation to be varied in response to information that becomes available as the presentation progresses. Furthermore, it would be advantageous that any such method for describing a dynamic media presentation be orthogonal to the actual type of information each media stream contains. In addition, it would be advantageous to provide a method of communication (or association) whereby some components of a presentation are dynamically specified as required and others are dynamically specified as optional. Such a dynamic description would allow, for instance, all clients to receive a base level audio stream and a base level video stream so as to render the core of a presentation, while allowing additional optional components to be received by those clients that have the processing or bandwidth capability to utilize them. Such dynamic descriptions of media stream associations are not provided by SDP.

DETAILED DESCRIPTION

Embodiments of the present invention provide for dynamically defining a variable set of media streams belonging to a media presentation, along with their dependencies, by utilizing a control stream. In a preferred embodiment, the control stream is a set of data packets, where each such data packet is the payload for an RTP packet. We refer to such data packets for the control steam as RTP Association Payload (RAP) packets.

By providing a control stream separate from the individual media streams making up the media presentation, the dynamic description of the media presentation is facilitated. One such advantage is that the control stream can be provided in real time, thereby allowing media presentations to vary dynamically in real time so that new components of the media presentation, such as additional audio tracks, video sequences, or any other payloads, can be added in real time. Similarly, components of the media presentation may be removed in real time as well.

Providing a control stream for dynamically describing (associating) various media streams and their dependencies allows the composition (i.e., the set of media streams and their dependencies) of a media presentation to be varied in response to information that becomes available as the presentation progresses. Furthermore, a control stream provides a methodology for expressing the relationships of the components of a streaming media presentation which is orthogonal to the actual type of information inherent in each media stream comprising the media presentation.

The dependencies among the set of media streams comprising a media presentation can be illustrated by directed graphs. For a static media presentation, a single directed graph is sufficient. However, for a dynamic media presentation in which the set of media streams and their dependencies may be variable, more than one directed graph may be required, in which case a single directed graph is a valid description of the media presentation only for some time duration less than the time duration of the media presentation.

Figure 1:
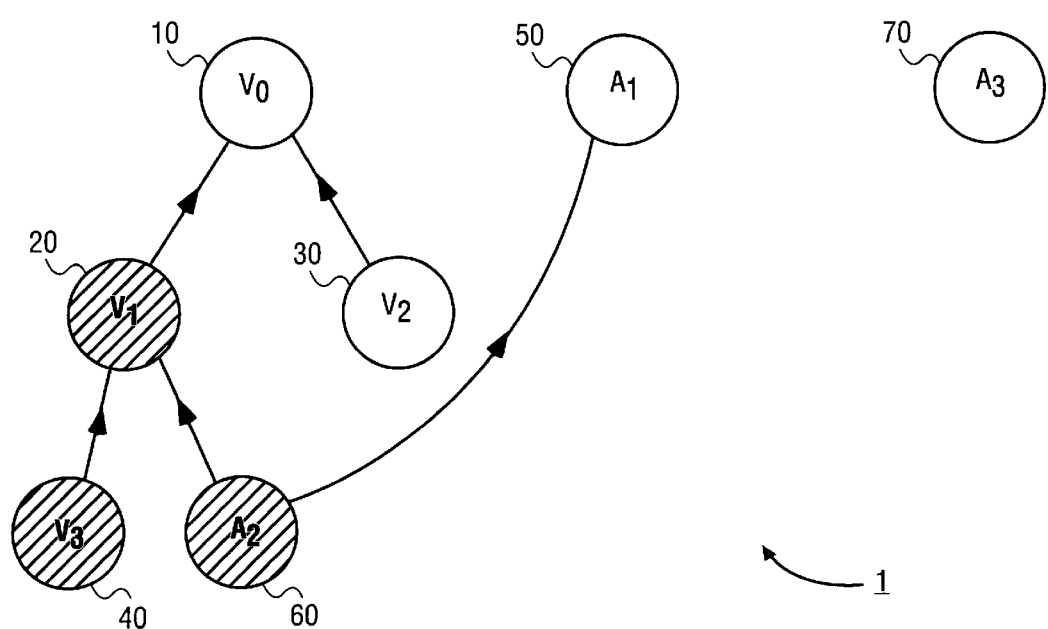
FIG. 1 is a directed graph illustrating dependencies among a set of media streams.

Directed graph 1 of FIG. 1 is an example of a directed graph illustrating dependencies that may exist for a particular media presentation for a period of time that may be less than the time duration of the media presentation. Nodes in directed graph 1 represent a particular media stream where, for example, a "V" denotes a video media stream and an "A" denotes an audio media stream. Nodes with cross-hatching denote optional media streams. That is, they are not required by the receiver for rendering the media presentation. Media streams which are not optional are by definition required. An arrow directed from a first node to a second node indicates that the first node depends directly upon the second node, so that the second node is required for the first node to be of use.

Directed graph 1 shows that stream 10 is a required, elementary video stream. Stream 20 is an optional video stream depending directly upon stream 10, whereas stream 30 is a required video stream depending directly upon stream 10. Thus, both streams 20 and 30 require stream 10 for rendering. Stream 40 is an optional video stream depending directly upon stream 20, and therefore requires both streams 20 and 10 for rendering. Stream 50 is a required audio stream. Stream 60 is an optional audio stream depending directly upon streams 20 and 50. Stream 70 is a required, elementary audio stream. Streams 20, 30, 40, and 60 are of coupled stream type because they all depend upon elementary stream 10 in order to be properly rendered.

Note that directed graph 1 is not completely connected, and that a single stream, namely stream 60, is dependent upon more than one stream. For simplicity, directed graph 1 does not explicitly indicate the kind of dependencies among the streams. For example, stream 20 may describe a complicated transformation that is to be applied to stream 10, or it may be a relatively simple transformation involving the overlay of an image, represented by stream 20, upon stream 10, such as a television weatherman in front of a weather board.

All media streams in the media presentation depicted in directed graph 1 may, for example, be RTP packets. However, embodiments of the present invention need not be limited to media streams employing RTP packets.

RAP packets allow for a simple yet effective method for describing complicated media presentations with a rich degree of dependencies, such as a media presentation described by directed graph 1.

Figure 2:
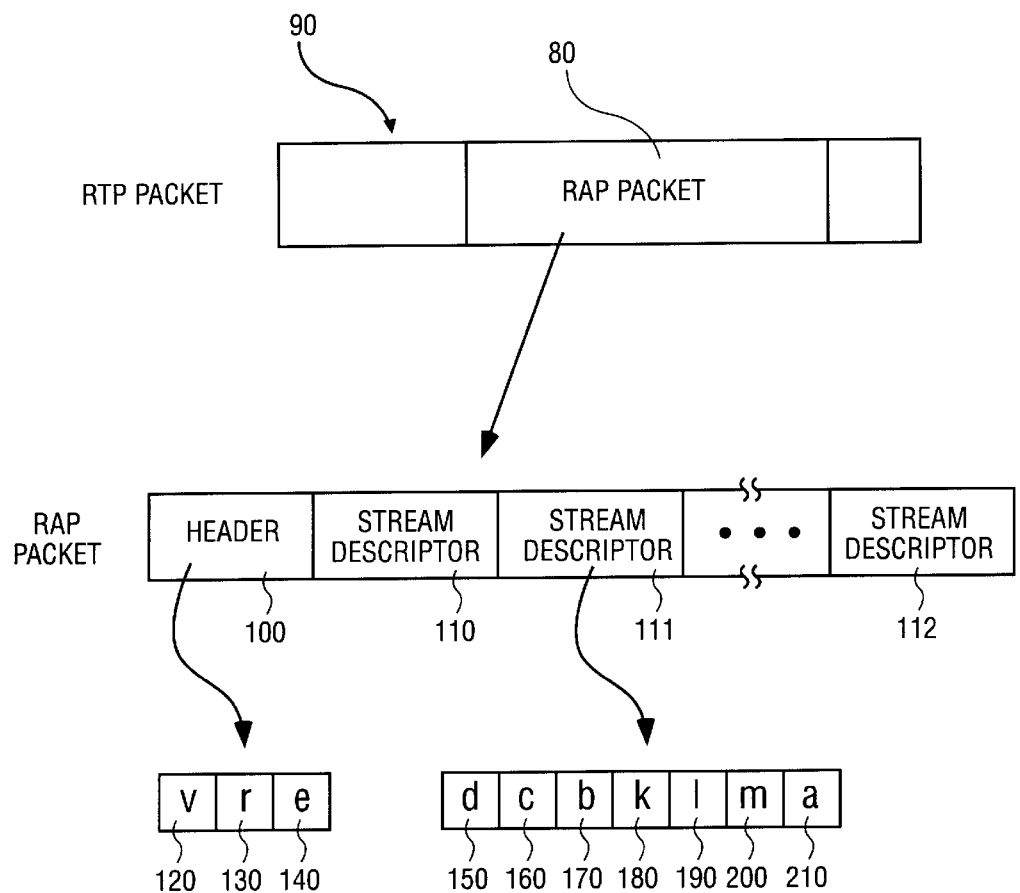
FIG. 2 illustrates an RTP packet having a RAP packet as its payload, along with various fields within the RAP packet.

Referring to FIG. 2, RAP packet 80 is a payload for RTP packet 90. RAP packet 80 comprises a RAP Header 100 followed by one or more Stream Descriptors 110–112. For simplicity, three Stream Descriptors are shown in FIG. 2, whereas in practice the number of Stream Descriptors at any given time will be equal to the number of media streams comprising the media presentation. There is a one-to-one mapping or association between each Stream Descriptor and each media stream comprising the media presentation. Each media stream associated with a Stream Descriptor is implicitly numbered according to the numerical order of its associated Stream Descriptor. In FIG. 2, the media streams associated with Stream Descriptors 110, 111, and 112 would respectively be numbered as one, two, and three.

In a preferred embodiment, RAP packets will be transmitted whenever the components (i.e., the media streams comprising a media presentation) and their dependencies of a media presentation change, and will be transmitted periodically during an idle presentation, (where in an idle presentation the set of media streams and their dependencies are not changing). These periodic transmissions should occur, even in the absence of changes in stream relationships, in order to ensure that new clients, and clients who missed previous transmissions due to data loss, are able to rapidly establish a correct understanding of the current set of stream associations. In a preferred embodiment, during an idle presentation RAP packets should be transmitted such that they utilize at most 5% of the total presentation bandwidth.

Header 100 comprises Version (v) field 120, Last Required Stream Descriptor (r) field 130, and Expiration Time Stamp (e) 140. Stream Descriptors 110 comprises Dependency Information (d) field 150, Connection Information (c) field 160, Bandwidth Information (b) field 170, Encryption Key (k) field 180, Acceptable Loss (l) field 190, Media Name and Transport Address (m) field 200, and Attribute Line (a) field 210. Other Stream Descriptors may have these fields, or a subset of them. (A subset may not necessarily be a proper subset, so that a subset of a set A is also A.) The fields comprising a Stream Descriptor will also be referred to as attributes. In a preferred embodiment, the order of attributes within a Stream Descriptor are fixed and begin with the d attribute so that parsing of an RAP packet into its component Stream Descriptors can be easily accomplished. Other methods may be used in other embodiments, however.

The v field 120 describes the RAP version number being used. The initial version of the RAP protocol is contemplated to be version 0. The r field describes the last required stream in a presentation. In FIG. 2, if only the media streams associated with Stream Descriptors 110 and 111 were required, then r=2. In a preferred embodiment, if any required stream is not received by a client (either wholly or due to a reception loss exceeding some acceptable value), then the entire presentation should not be rendered. If no streams are required for a presentation, then r=0. All streams that are numbered higher than r are optional. Thus, if for FIG. 2 r=2, then the stream associated with Stream Descriptor 112 (stream number 3) is optional.

In a preferred embodiment, there are two types of Expiration Time Stamps described by an e field: a predictive Expiration Time Stamp and a descriptive Expiration Time Stamp. RTP packet 90 containing RAP packet 80 will have its own RTP Time Stamp. An RAP Expiration Time Stamp greater in value than the RTP Time Stamp of the RTP packet in which the RAP packet is its payload is defined to be predictive, whereas if the RAP Expiration Time Stamp is equal in value to the RTP Time Stamp, the RAP Expiration Time Stamp is defined to be descriptive.

Predictive Expiration Time Stamps are used by the sender of the presentation when the set of media streams and their dependencies described by RAP packets are guaranteed by the sender to be static at least until the time indicated by the predictive Expiration Time Stamp. Descriptive Expiration Time Stamps are used by the sender of the presentation when the sender has no knowledge of the length of time for which the current set of media streams and their dependencies as described by the then transmitted RAP packets are valid.

For the case when the Expiration Time Stamp is descriptive for a first RAP packet, once the next successive RAP packet has been received (which can be determined by examining the RTP sequence numbers), then the composition of the media presentation as described by the first RAP packet may be considered valid by the receiver for a duration of time indicated by the two RTP time stamps, and consequently the media streams may be safely rendered as described by the first RAP packet. However, if a RAP packet is lost, then the media presentation should not be rendered until two consecutive RAP packets are received.

Descriptive Expiration Time Stamps impose a heavy burden of processing on the receiver, and also make rendering a presentation very susceptible to significant degradation due to the loss of any single RAP packet. As such, it is advantageous for senders to delay transmitting a presentation until after a dependency analysis is performed in order to be able to use predictive Expiration Time Stamps. Greater delay on the part of the sender will allow longer duration expirations, at the cost of greater latency. In the case of a pre-recorded presentation, where there is little reason for a sender to use descriptive Expiration Time Stamps, a sender should use predictive Expiration Time Stamps.

For a given media stream, its associated RAP Stream Descriptor contains information used to determine what other media streams the given media stream requires to have "value". Within this context, a media stream may have value for either technical reasons or "social" reasons. An example of the former is a layer of an hierarchically encoded video stream which requires a base layer media stream in order to be successfully rendered. An example of the latter is the case in which the presenter of the media presentation has determined that a receiver should only view a presentation if certain critical information is received. In light of this, dependencies among media streams may not be "true" dependencies. That is, a media stream may depend upon another media stream only because the sender "requires" the dependency, not because one media stream cannot be rendered without the other.

In a preferred embodiment, RAP Stream Descriptors use a subset of the attributes used in SDP. In addition, new attributes are added to express media stream dependencies, such as for example the case of layered video streams. Each RAP Stream Descriptor only describes a single media stream and its relationships to other media streams, and thus does not contain significant parts of the identification information present in SDP. This information is removed in order to conserve bandwidth, as it is redundant with a base level SDP description which would be used to indicate the RAP control stream that describes a presentation.

For a given media stream, d field or attribute 150 contains a list of media streams needed for rendering the given media stream. These required media streams may be for technical or social reasons, as discussed earlier. In a preferred embodiment, a media stream that does not depend upon any other media streams will have d=0.

Note that the dependency information carried in the d field of a Stream Descriptor is not intended to be a complete description of how the media stream associated with the Stream Descriptor is related to the media streams it depends upon. Rather, the d field simply expresses which streams must be received for other streams to be successfully rendered. More detailed information on the precise dependency, such as band content in hierarchical encoding, should be indicated either via payload specific media attribute lines or through an in-band method on a per-stream basis.

The c field contains connection data and is identical to that specified in the SDP protocol, with the exception that only a single media stream (layer) may be specified. Multiple layers or streams are specified in the RAP protocol via the use of additional RAP Stream Descriptors.

The b field provides the bandwidth needed to receive a media stream. In a preferred embodiment, the b field is optional and is in the SDP protocol.

The k field provides an encryption key. In a preferred embodiment, the k field is optional and in the SDP protocol.

The l field indicates the fraction of loss acceptable for a particular media stream. In a preferred embodiment, the l field is optional. If the l field is specified, then any media stream in which the fraction of packets correctly received is less than that specified in the l field should not be rendered. The fraction of packets may be computed over some given sliding window of time. By correctly received, we mean that all bits within a data packet are received and the data packet satisfies an error correction scheme. Note that not rendering a given media stream will result in all dependent streams not being rendered.

The m field provides the media name and transport address. In a preferred embodiment, the m field is identical to an SDP media announcement with the exception of a second field, which may only specify a single transport port. The specification of multiple ports for hierarchically encoded streams is achieved in the RAP protocol by using multiple RAP Stream Descriptors.

The a field provides media attribute lines, and is opaque to the RAP protocol. In a preferred embodiment, the a field is optional. For example, the a field may specify a video stream as a base layer or a higher layer.

Table 1 provides an example of an RAP payload packet describing a media composition according to directed graph 1 of FIG. 1. For simplicity, an arbitrary field value is indicated by an ellipsis. For the example of Table 1, we assume that the RTP time stamp of the RTP packet in which the RAP packet is a payload is the value 9,000 and that the frequency unit is 9 KHz, or equivalently, the time unit is 1/9,000 seconds. The RAP Expiration Time Stamp for the packet of Table 1 is 45,000, and is therefore of the predictive type. In this case, the media composition described by the packet of Table 1 is guaranteed to be valid for four seconds because (45,000−9,000)/9,000=4. The r field is set to 4 because streams 10, 30, 50, and 70 are required, as indicated in FIG. 1. Note that because stream 60 of FIG. 1 depends directly upon both stream 20 and stream 50, its d field is 3; 5 since streams 50 and 20 are associated with the third and fifth Stream Descriptors, respectively, in the RAP packet described by Table 1.

Various modifications may be made to the embodiments described above without departing from the scope of the present invention as claimed below.

TABLE 1

| Field Type | | field | Field Values field value |
|---|---|---|---|
| Header | | v | 0 |
| | | r | 4 |
| | | e | 45,000 |
| Stream Descriptor for | $V_0$ | d | 0 |
| | | c | IN ip4 239.2.3.4/127 |
| | | m | video 5680 RTP/AVP 31 |
| | | a | (attribute to identify as $V_0$) |
| Stream Descriptor for | $V_2$ | d | 1 |
| | | c | IN ip4 239.2.3.4/127 |
| | | m | video 568 RTP/AVP 31 |
| | | a | (attribute to identify as $V_2$) |
| Stream Descriptor for | $A_1$ | d | 0 |
| | | c | . . . |
| | | m | audio 568 RTP/AVP 0 |
| | | a | (attribute to identify as $A_1$) |
| Stream Descriptor for | $A_3$ | d | 0 |
| | | c | . . . |
| | | m | audio . . . |
| | | a | (attribute to identify as $A_3$) |
| Stream Descriptor for | $V_1$ | d | 1 |
| | | c | . . . |
| | | m | video . . . |
| | | a | (attribute to identify as $V_1$) |
| Stream Descriptor for | $V_3$ | d | 5 |
| | | c | . . . |
| | | m | video . . . |
| | | a | (attribute to identify as $V_3$) |
| Stream Descriptor for | $A_2$ | d | 3; 5 |
| | | c | . . . |
| | | m | audio . . . |
| | | a | (attribute to identify as $A_2$) |

What is claimed is:

1. A method for communicating between a sender and a receiver a set of dependencies among a set of media streams, the method comprising the steps of:

creating a payload data packet having a header and a set of stream descriptors, wherein the header has a required stream field, wherein each stream descriptor is associated with a unique media stream belonging to the set of media streams and has a connection field to provide a network address for its associated media stream, and wherein each stream descriptor belonging to a subset of the set of stream descriptors has a dependency field;

creating a control data packet having the payload data packet as a payload;

setting the required stream field to a value indicative of a required set of media streams, the required set of media streams being a subset of the set of media streams; and setting the dependency fields to indicate the set of dependencies.

2. The method as set forth in claim 1, further comprising the steps of:

receiving by the receiver the control data packet to obtain the payload data packet;

rendering by the receiver all received media streams belonging to the set of media streams only if all media streams belonging to the required set of media streams are correctly being received by the receiver; and rendering each media stream only if all media streams upon which said each media stream is dependent upon as indicated by the dependency fields are correctly being received by the receiver.

3. The method as set forth in claim 1, further comprising the steps of:

associating each media stream with a character belonging to a character set; and setting the dependency field for each stream descriptor belonging to the subset of stream descriptors to at least one character belonging to the character set to indicate that the media stream associated with said each stream descriptor depends upon an at least one media stream associated with the at least one character.

4. The method as set forth in claim 3, wherein the character set is an ordered set having a less than relation <, where for any two characters α and β belonging to the character set, α<β if and only if the stream descriptor associated with the media stream associated with α is closer in position to the header than the stream descriptor associated with the media stream associated with β.

5. The method as set forth in claim 4, further comprising the step of:

setting the required stream field to a character belonging to the character set so that the required set of media streams are precisely those media streams having associated characters less than the character to which the required stream field is set.

6. The method as set forth in claim 5, further comprising the steps of:

receiving by the receiver the control data packet to obtain the payload data packet; and rendering by the receiver all received media streams belonging to the set of media streams only if all media streams belonging to the required set of media streams as indicated by the required stream field are correctly being received by the receiver.

7. The method as set forth in claim 6, further comprising the steps of:

providing each stream descriptor with an acceptable loss field; and rendering by the receiver each media stream belonging to the set of media streams only if the fraction of correctly received data packets for said each media stream is at least equal to each acceptable loss field associated with each stream descriptor associated with said each media stream, where a data packet is correctly received if all data bits making up the data packet are received and the data packet satisfies an error correction scheme.

8. The method as set forth in claim 1, further comprising the steps of:

providing each stream descriptor with an acceptable loss field;

receiving by the receiver the control data packet to obtain the payload data packet; and rendering by the receiver each media stream belonging to the set of media streams only if (i) the fraction of correctly received data packets for said each media stream is at least equal to the value of the acceptable loss field within the stream descriptor associated with said each media stream; and (ii) for all media streams belonging to the required set of media streams, the fraction of correctly received data packets is at least equal to the value of their associated acceptable loss fields.

9. The method as set forth in claim 8, further comprising the step of:

rendering each media stream dependent upon another media stream indicated by the dependency fields only if for every media stream upon which said each media stream is dependent upon the fraction of correctly received data packets is at least equal to the value of the acceptable loss field within the stream descriptor associated with said every media stream.

10. The method as set forth in claim 1, further comprising the steps of:

providing the control data packet with a time stamp field indicating a clock time; and providing the header with an expiration time stamp field having a value indicating a time greater than the clock time to indicate that the set of relationships are valid at least until the time indicated by the expiration time stamp.

11. The method as set forth in claim 10, further comprising the steps of:

receiving by the receiver the control data packet to obtain the payload data packet;

rendering by the receiver all received media streams belonging to the set of media streams only if all media streams belonging to the required set of media streams are correctly being received by the receiver; and rendering each media stream related to another media stream indicated by the dependency fields only if all media streams upon which said each media stream is dependent upon are being correctly received by the receiver.

12. The method as set forth in claim 10, further comprising the steps of:

associating each media stream with a character belonging to a character set; and setting the dependency field for each stream descriptor belonging to the subset of stream descriptors to at least one character belonging to the character set to indicate that the media stream associated with said each stream descriptor depends upon an at least one media stream associated with the at least one character.

13. The method as set forth in claim 12, wherein the character set is an ordered set having a less than relation <, where for any two characters α and β belonging to the character set, α<β if and only if the stream descriptor associated with the media stream associated with α is closer in position to the header than the stream descriptor associated with the media stream associated with β.

14. The method as set forth in claim 13, further comprising the step of:
setting the required stream field to a character belonging to the character set so that the required set of media streams are precisely those media streams having associated characters less than the character to which the required stream field is set.

15. The method as set forth in claim 14, further comprising the steps of:
receiving by the receiver the control data packet to obtain the payload data packet; and
rendering by the receiver all received media streams belonging to the set of media streams only if all media streams belonging to the required set of media streams are correctly being received by the receiver.

16. The method as set forth in claim 14, further comprising the steps of:
receiving by the receiver the control data packet to obtain the payload data packet;
providing each stream descriptor with an acceptable loss field; and
rendering by the receiver each media stream belonging to the set of media streams only if the fraction of correctly received data packets for said each media stream is at least equal to each acceptable loss field associated with each stream descriptor associated with said each media stream, where a data packet is correctly received if all data bits making up the data packet are received and the data packet satisfies an error correction scheme.

17. The method as set forth in claim 10, further comprising the steps of:
providing each stream descriptor with an acceptable loss field;
receiving by the receiver the control data packet to obtain the payload data packet; and
rendering by the receiver each media stream belonging to the set of media streams only if
(i) the fraction of correctly received data packets for said each media stream is at least equal to the value of the acceptable loss field within the stream descriptor associated with said each media stream; and
(ii) for all media streams belonging to the required set of media streams, the fraction of correctly received data packets is at least equal to the value of their associated acceptable loss fields.

18. The method as set forth in claim 17, further comprising the step of:
rendering each media stream dependent upon another media stream indicated by the dependency fields only if for every media stream upon which said each media stream is dependent upon the fraction of correctly received data packets is at least equal to the value of the acceptable loss field within the stream descriptor associated with said every media stream.

19. A method for receiving a set of dependencies among a set of media streams, the method comprising the step of:
receiving a first control data packet, the first control data packet comprising:
a sequence field indicating a first sequence number;
a time stamp field indicating a clock time; and
a first payload data packet having:
a header with a required stream field having a value indicative of a first required set of media streams, the first required set of media streams being a subset of the set of media streams;
a set of stream descriptors each having a connection field to provide a network address for an associated media stream belonging to the set of media streams, and wherein each stream descriptor belonging to a first subset of the set of stream descriptors within the first payload data packet has a dependency field, the dependency fields indicating the set of dependencies; and
an expiration time stamp field.

20. The method as set forth in claim 19, further comprising the steps of, when the expiration time stamp field for the first control data packet indicates a time greater than the clock time:
rendering all received media streams belonging to the set of media streams only if all media streams belonging to the first required set of media streams indicated by the required stream field within the first payload data packet are being correctly received; and
rendering each media stream belonging to the set of media streams only if all media streams upon which said each media stream is dependent upon as indicated by the dependency fields within the first payload data packet are being correctly received.

21. The method as set forth in claim 20, further comprising the steps of, when the expiration time stamp field for the first control data packet indicates a time equal to the clock time:
(i) rendering all received media streams belonging to the set of media streams only if all media streams belonging to the first required set of media streams indicated by the required stream field within the first payload data packet are being correctly received; and
(ii) rendering each media stream belonging to the set of media streams only if all media streams upon which said each media stream is dependent upon as indicated by the dependency fields within the first payload data packet are being correctly received;
wherein steps (i) and (ii) are performed only when a second control data packet is received having a second sequence number indicating that the first and second control data packets are consecutive data packets, the second control data packet comprising:
a second payload data packet having:
a header with a required stream field having a value indicative of a second required set of media streams, the second required set of media streams being identical to the first required set of media streams;
a set of stream descriptors each having connection fields identical in value to the connection fields within the first payload data packet, each, if having a dependency field, forming a second subset identical in ordering to the first subset of stream descriptors and having dependency fields equal in value to the dependency fields within the first subset of stream descriptors.

22. The method as set forth in claim 19, further comprising the steps of:
providing each stream descriptor within the first payload data packet with an acceptable loss field;
(a) rendering each media stream belonging to the set of media streams only if
(i) the fraction of correctly received data packets for said each media stream is at least equal to the value of the acceptable loss field within the stream descriptor associated with said each media stream; and (ii) for all media streams belonging to the first required set of media streams, the fraction of correctly received data packets is at least equal to the value of their associated acceptable loss fields; and (b) rendering each media stream dependent upon another media stream indicated by the dependency fields within the first payload data packet only if for every media stream upon which said each media stream is dependent upon the fraction of correctly received data packets is at least equal to the value of the acceptable loss field within the stream descriptor associated with said every media stream;

wherein, when the expiration time stamp field for the first control data packet indicates a time equal to the clock time, steps (a) and (b) are performed only when a second control data packet is received having a second sequence number indicating that the first and second control data packets are consecutive data packets, the second control data packet comprising:

a second payload data packet having:
  a header with a required stream field having a value indicative of a second required set of media streams, the second required set of media streams being identical to the first required set of media streams; and
  a set of stream descriptors each having connection fields identical in value to the connection fields within the first payload data packet, each, if having a dependency field, forming a second subset identical in ordering to the first subset of stream descriptors and having dependency fields equal in value to the dependency fields within the first subset of stream descriptors.

23. A computer readable storage medium, wherein stored in the storage medium are instructions to program a computer to:

receive a first control data packet, the first control data packet comprising:
  a sequence field indicating a first sequence number;
  a time stamp field indicating a clock time; and
  a first payload data packet having:
    a header with a required stream field having a value indicative of a first required set of media streams, the first required set of media streams being a subset of a set of media streams;
    a set of stream descriptors each having a connection field to provide a network address for an associated media stream belonging to the set of media streams, and wherein each stream descriptor belonging to a first subset of the set of stream descriptors within the first payload data packet has a dependency field, the dependency fields indicating a set of dependencies among the set of media streams; and
    an expiration time stamp field.

24. The storage medium as set forth in claim 23, further comprising instructions to program a computer to perform the steps of, when the expiration time stamp field for the first control data packet indicates a time greater than the clock time:

rendering all received media streams belonging to the set of media streams only if all media streams belonging to the first required set of media streams indicated by the required stream field within the first payload data packet are being correctly received; and rendering each media stream belonging to the set of media streams only if all media streams upon which said each media stream is dependent upon as indicated by the dependency fields within the first payload data packet are being correctly received.

25. The storage medium as set forth in claim 24, further comprising instructions to program a computer to perform the steps of, when the expiration time stamp field for the first control data packet indicates a time equal to the clock time:

(i) rendering all received media streams belonging to the set of media streams only if all media streams belonging to the first required set of media streams indicated by the required stream field within the first payload data packet are being correctly received; and (ii) rendering each media stream belonging to the set of media streams only if all media streams upon which said each media stream is dependent upon as indicated by the dependency fields within the first payload data packet are being correctly received;

wherein steps (i) and (ii) are performed only when a second control data packet is received having a second sequence number indicating that the first and second control data packets are consecutive data packets, the second control data packet comprising:

a second payload data packet having:
  a header with a required stream field having a value indicative of a second required set of media streams, the second required set of media streams being identical to the first required set of media streams;
  a set of stream descriptors each having connection fields identical in value to the connection fields within the first payload data packet, each, if having a dependency field, forming a second subset identical in ordering to the first subset of stream descriptors and having dependency fields equal in value to the dependency fields within the first subset of stream descriptors.

26. The storage medium as set forth in claim 23, further comprising instructions to program a computer to perform the steps of:

providing each stream descriptor within the first payload data packet with an acceptable loss field;

(a) rendering each media stream belonging to the set of media streams only if
  (i) the fraction of correctly received data packets for said each media stream is at least equal to the value of the acceptable loss field within the stream descriptor associated with said each media stream; and
  (ii) for all media streams belonging to the first required set of media streams, the fraction of correctly received data packets is at least equal to the value of their associated acceptable loss fields; and (b) rendering each media stream dependent upon another media stream indicated by the dependency fields within the first payload data packet only if for every media stream upon which said each media stream is dependent upon the fraction of correctly received data packets is at least equal to the value of the acceptable loss field within the stream descriptor associated with said every media stream;

wherein, when the expiration time stamp field for the first control data packet indicates a time equal to the clock time, steps (a) and (b) are performed only when a second control data packet is received having a second sequence number indicating that the first and second control data packets are consecutive data packets, the second control data packet comprising:

a second payload data packet having:
  a header with a required stream field having a value indicative of a second required set of media streams, the second required set of media streams being identical to the first required set of media streams; and
  a set of stream descriptors each having connection fields identical in value to the connection fields within the first payload data packet, each, if having a dependency field, forming a second subset identical in ordering to the first subset of stream descriptors and having dependency fields equal in value to the dependency fields within the first subset of stream descriptors.

* * * * *